(12) United States Patent
Wang

(10) Patent No.: US 9,520,229 B2
(45) Date of Patent: Dec. 13, 2016

(54) ROTARY TRANSFORMERS FOR ELECTRICAL MACHINES

(71) Applicant: Hamilton Sundstrand Corporation, Charlotte, NC (US)

(72) Inventor: Yang Wang, East Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 322 days.

(21) Appl. No.: 14/179,376

(22) Filed: Feb. 12, 2014

(65) Prior Publication Data

US 2015/0228405 A1   Aug. 13, 2015

(51) Int. Cl.
*H01F 38/18*  (2006.01)
*H02K 11/00*  (2016.01)

(52) U.S. Cl.
CPC ........... *H01F 38/18* (2013.01); *H02K 11/0094* (2013.01); *H02K 11/225* (2016.01)

(58) Field of Classification Search
CPC ........ H02K 19/10; H02K 19/12; H02K 19/26; H02K 19/28; H02K 19/30; H02K 19/38; H02K 11/21; H02K 11/225; G08C 18/46; G08C 19/48; H01F 38/18
USPC .... 336/118–120, 122, 123, 130; 340/870.32, 340/870.35; 324/207.25; 322/59, 61
See application file for complete search history.

(56) References Cited

U.S. PATENT DOCUMENTS

| | | | | |
|---|---|---|---|---|
| 2,585,050 A * | 2/1952 | Simon | ...................... | H01F 29/12 323/264 |
| 4,612,486 A * | 9/1986 | Ban | ........................ | H02K 29/12 310/113 |
| 4,754,220 A * | 6/1988 | Shimizu | .................. | G01D 5/243 324/207.18 |
| 5,349,293 A * | 9/1994 | Tanaka | ..................... | G01B 7/30 324/207.16 |
| 5,585,709 A * | 12/1996 | Jansen | ..................... | H02P 6/183 318/720 |
| 5,770,909 A * | 6/1998 | Rosen | .................. | H02K 11/042 310/113 |
| 6,278,212 B1 * | 8/2001 | Kalsi | ..................... | H02K 16/025 310/102 R |
| 6,512,437 B2 * | 1/2003 | Jin | ......................... | H01F 38/14 336/120 |

(Continued)

FOREIGN PATENT DOCUMENTS

| | | | | |
|---|---|---|---|---|
| DE | 19810566 | * | 9/1999 | ............. H02K 16/00 |
| EP | 0759539 A1 | | 2/1997 | |
| EP | 2080991 A1 | | 7/2009 | |
| EP | 2546963 A2 | | 1/2013 | |

(Continued)

OTHER PUBLICATIONS

European Search Report dated Jun. 14, 2016 on European Patent Application No. EP 15154525.

*Primary Examiner* — Burton Mullins
(74) *Attorney, Agent, or Firm* — Locke Lord LLP; Scott D. Wofsy; Christopher J. Cillié

(57) ABSTRACT

A rotary transformer includes a shaft, a stator, and a rotor. The stator has a pole surface extending about the shaft. The rotor has a pole surface and operatively connects to the shaft for common rotation with the shaft such that the pole surface of the rotor axially opposes the pole surface of the rotor at an overlap area. The overlap are between the pole surfaces is greater at a first rotor position that at a second rotor position for superimposing a signal indicative of rotor position on electrical power transferred between the stator and rotor.

10 Claims, 7 Drawing Sheets

(56) References Cited

U.S. PATENT DOCUMENTS

| | | | | |
|---|---|---|---|---|
| 7,197,113 | B1* | 3/2007 | Katcha | A61B 6/032 |
| | | | | 378/101 |
| 7,663,462 | B2* | 2/2010 | Makuth | H01F 38/18 |
| | | | | 336/130 |
| 7,816,828 | B2* | 10/2010 | Cordes | H02K 11/0094 |
| | | | | 29/622 |
| 8,542,085 | B2* | 9/2013 | Stancu | H01F 38/18 |
| | | | | 310/160 |
| 8,593,095 | B2* | 11/2013 | Markunas | H02P 6/18 |
| | | | | 318/400.33 |
| 2005/0035675 | A1 | 2/2005 | Yamaguchi et al. | |
| 2005/0168091 | A1* | 8/2005 | Miya | G01D 5/2013 |
| | | | | 310/168 |
| 2010/0102681 | A1 | 4/2010 | Koga et al. | |
| 2013/0241367 | A1* | 9/2013 | Taniguchi | H02K 11/0094 |
| | | | | 310/68 D |
| 2014/0145537 | A1* | 5/2014 | Goncalves | H02K 1/06 |
| | | | | 310/154.01 |
| 2014/0340185 | A1* | 11/2014 | Verleur | H01F 27/245 |
| | | | | 336/120 |
| 2015/0097372 | A1* | 4/2015 | Patel | H02K 19/12 |
| | | | | 290/31 |
| 2015/0130444 | A1* | 5/2015 | Goto | G01D 5/14 |
| | | | | 324/207.15 |

FOREIGN PATENT DOCUMENTS

| | | | | |
|---|---|---|---|---|
| EP | 2602917 | A1 | 6/2013 | |
| FR | 2275055 | * | 1/1976 | H02K 29/02 |
| GB | 2408154 | * | 5/2006 | H02K 19/00 |
| WO | 2013172315 | * | 11/2013 | G01D 5/20 |

* cited by examiner

ROTARY TRANSFORMERS FOR ELECTRICAL MACHINES

BACKGROUND OF THE INVENTION

1. Field of the Invention

The present disclosure relates to electrical machines, and more particularly to electric slip rings with built-in resolvers for synchronous machines and doubly fed induction machines.

2. Description of Related Art

Synchronous machines like synchronous motors, synchronous generators, and synchronous motor/generators typically include rotors and stators. The stator of a synchronous motor typically receives alternating current and rotates the rotor in synchronization with the frequency of the applied current. A prime mover typically rotates the rotor of a synchronous generator such that the stator outputs electrical current from the stator with a frequency corresponding to the rotor rotation frequency. Synchronized motor/generators typically operate as either synchronous motors or synchronous generators depending on the received input.

Synchronous and doubly fed induction machines generally include rotor position sensors and exciters. Rotor position sensors report the angular position of the rotor for purposes of controlling operation of the machine. Exciters transfer electrical power between the machine stator and rotor, generally through a slip ring or rotary transformer. Slip rings typically transfer electrical power through physical contact between the stator and rotor. Rotary transformers typically transfer electrical power without physical contact between the stator and rotor. Such electrical machines have generally been considered satisfactory for their intended purpose. However, there is still a need in the art for improved systems and methods for detecting rotor position and for transferring electrical power between rotors and stators. The present disclosure provides a solution for this need.

SUMMARY OF THE INVENTION

A rotary transformer includes a shaft, a stator, and a rotor. The shaft connects to the rotor for common rotation therewith and with respect to the stator. The rotor and stator each include a respective pole surface extending about the shaft. The rotor pole surface axially opposes the stator pole surface to form an overlap area. The overlap area varies as a function of rotor position, overlap area between the pole surfaces being greater at a first rotor position than at a second rotor position for superimposing a signal indicative of rotor position on electrical power transferred between the stator and rotor.

In certain embodiments the periphery of the rotor pole surface can be orthogonal with respect to the shaft. The rotor pole surface can have an oblong shape with a longitudinal axis that is longer than the lateral axis of the rotor pole surface. The oblong shape can be an ellipse.

In accordance with certain embodiments the periphery of the stator pole surface can be orthogonal with respect to the shaft. The stator pole surface can have oblong shape with a longitudinal axis that is longer than the lateral axis of the surface. The oblong shape can be an ellipse. Overlap area between the rotor pole surface and the stator pole surface can be equivalent in at least two rotor positions separated by 180 degrees of rotor rotation.

It is contemplated that in certain embodiments the stator can be a first stator with a first stator pole surface and that the rotary transformer can include a second stator with a second stator pole surface. The rotor pole surface can be a rotor first pole surface and the rotor can have a rotor second pole surface on a side of the rotor opposite the rotor first pole surface. The first stator pole surface can axially oppose the rotor first pole surface, the second stator pole surface can axially oppose the rotor second pole surface, and each stator pole surface can be separated from the respective rotor pole surface by an axial gap. The second stator pole surface can be offset from the first stator pole surface with respect to the shaft rotation axis by 90 degrees or by any other suitable angular offset.

It is also contemplated that in certain embodiments windings on the first and second stators can each receive a single phase of two-phase electrical power. Each stator can transmit the received electrical power to windings on opposed faces of the rotor across the gaps between the stators and rotor. The rotor can convert the received electrical power into three-phase electrical power for providing excitation current to main field windings of an electrical machine.

An exciter for an electrical machine includes a shaft, a rotor, and stator as described above. The shaft is operatively connected to the rotor of an electrical machine. Overlap area between pole surfaces of the stator and rotor is greater in the first position than in the second position for superimposing a signal indicative of the position of the electrical machine rotor on electrical power transferred between the rotor and stator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
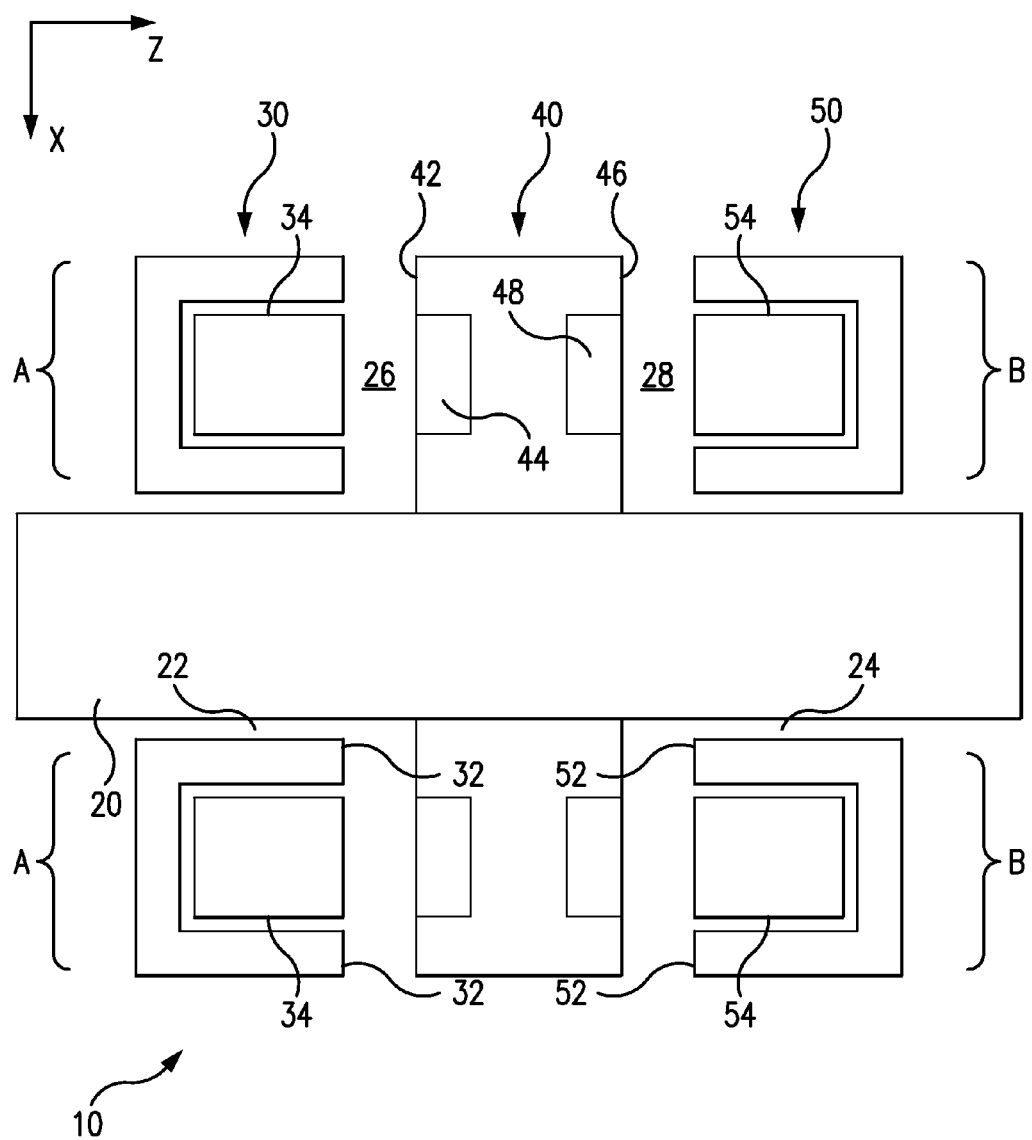
FIG. 1 is a schematic view of an exemplary embodiment of a rotary transformer constructed in accordance with the present disclosure, showing the stators and rotor.

Reference will now be made to the drawings wherein like reference numerals identify similar structural features or aspects of the subject disclosure. For purposes of explanation and illustration, and not limitation, a partial view of an exemplary embodiment of the rotary transformer in accordance with the disclosure is shown in FIG. 1 and is designated generally by reference character 10. Other embodiments of rotary transformers in accordance with the disclosure, or aspects thereof, are provided in FIGS. 2-5, as will be described. The systems and methods described herein can be used for transferring electrical power between stators and rotors and determining rotor position in electrical machines.

Rotary transformer 10 includes a shaft 20, a first stator 30, a rotor 40, and a second stator 50. Shaft 20 connects to rotor 40 and extends through respective radial gaps 22 and 24 disposed within first and second stators 30 and 50. Rotor 40 connects to a source of rotational energy (shown in FIG. 2) and is rotatable with respect to first and second stators 30 and 50. First and second stators 30 and 50 are each fixed with respect to rotor 40 and with respect to one another. First stator 30 includes a first stator pole surface 32 and first stator windings 34. First stator pole surface 32 is constructed from a magnetic material, extends about shaft 20, and is separated from shaft 20 by radial gap 22. First stator windings 34 are disposed within an annular groove defined in first stator 30 and extend about shaft 20.

Second stator 50 includes a second stator pole surface 52 and second stator windings 54. Second stator pole surface 52 is constructed from a magnetic material, extends about shaft 20, and is separated from shaft 20 by radial gap 24. Second stator windings 54 are disposed within an annular groove defined in second stator 50 and extend about shaft 20. Second stator pole surface 52 and second stator windings 54 both oppose first stator pole surface 32 and first stator windings 34 of first stator 30.

Rotor 40 includes a rotor first pole surface 42, rotor first windings 44, a rotor second pole surface 46, and rotor second windings 48. Rotor first and second pole surfaces 42 and 46 are constructed from a magnetic material and are disposed on axially opposed faces (ends) of rotor 40. Rotor first windings 44 are disposed in a groove defined in rotor first pole surface 42 and extend about shaft 20. Rotor second windings 48 are disposed in a groove defined in rotor second pole surface 46 and extend about shaft 20. Rotor first pole surface 42 and rotor first windings 44 are axially adjacent to and oppose first stator 30 across a first axial gap 26. Rotor second pole surface 46 and rotor second windings 48 are axially adjacent to and oppose second stator 50 across a second axial gap 28.

First stator 30 electromagnetically couples to rotor 40 such that current flow through first stator windings 34 induces corresponding current flow in rotor first windings 44. Second stator 50 electromagnetically couples to rotor 40 such that current flow in second stator windings 54 induces corresponding current flow in rotor second windings 48. This transfers, i.e. transmits, electrical power from first and second stators 30 and 50 to rotor 40.

Figure 2:
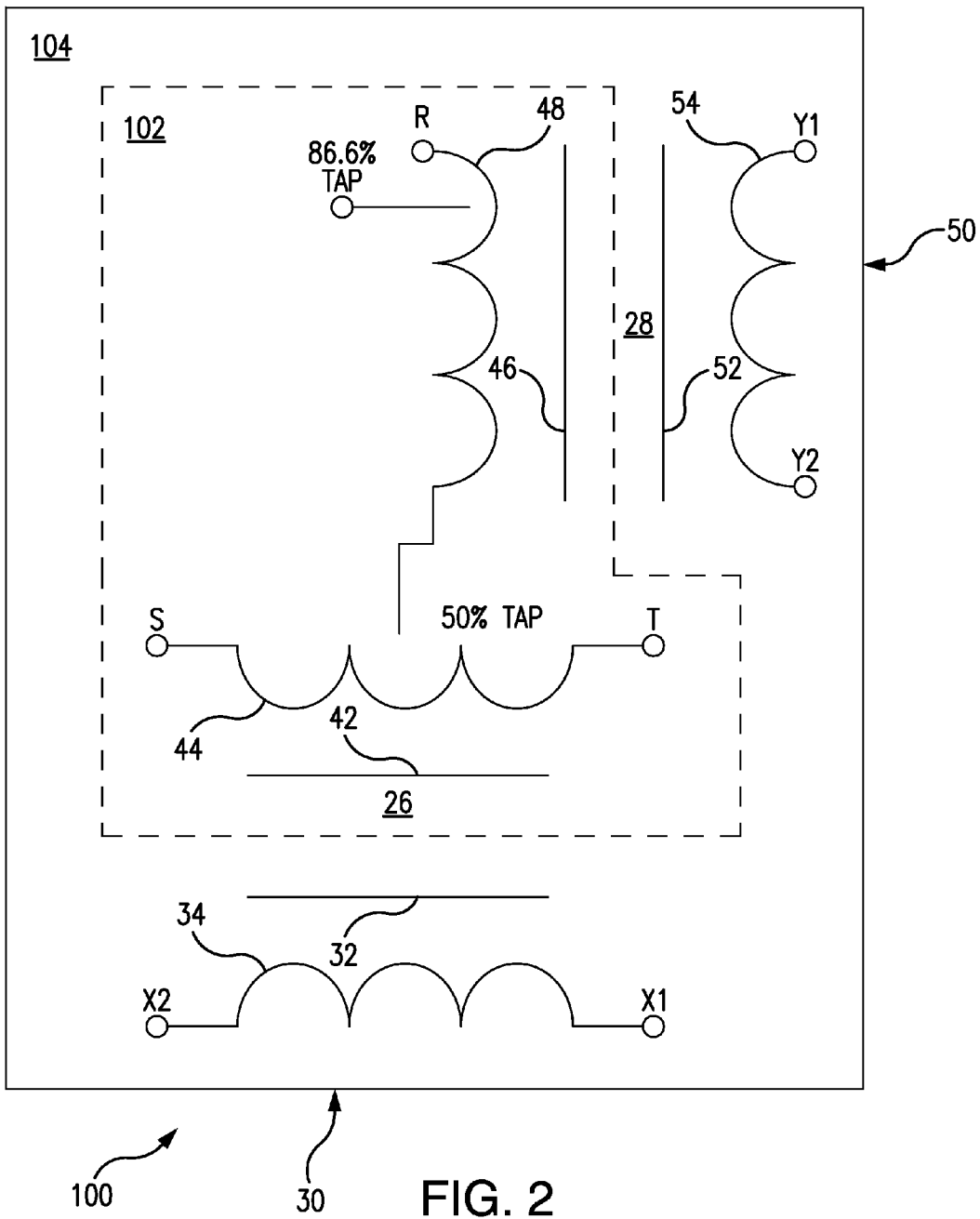
FIG. 2 is a schematic view of an exemplary embodiment of an electrical machine including the transformer illustrated in FIG. 1, showing a circuit diagram.

With reference to FIG. 2, an electrical machine 100 is shown. As illustrated, electrical machine 100 is a synchronous machine. As will be appreciated, electrical machine 100 can also be a doubly fed induction machine. Electrical machine 100 includes a rotating portion 102, a stationary portion 104, and rotary transformer 10. First and second stators 30 and 50 of rotary transformer 10 are fixed with respect to stationary portion 104. Shaft 20 and rotor 40 are operatively connected to rotating portion 102 for common rotation therewith and rotate with respect to stationary portion 104. Rotating portion 102 also includes main field windings (not shown for clarity purposes) electrically connected to rotor first and second windings 44 and 48 which receive electrical power transmitted contactlessly (i.e. without physical contact) between first and second stators 30 and 50 to rotor 40.

First stator 30, second stator 50, and rotor 40 form a Scott-T transformer configured for transforming two-phase electrical power into three-phase electrical power for exciting the main field windings of electrical machine 100. More specifically, sinusoidal excitation electrical power applied to first stator windings 34 at terminals X1 and X2 has the same amplitude and is 90 degrees out of phase with sinusoidal electrical power applied to second stator windings at terminals Y1 and Y2. These current flows induce corresponding current flows in rotor first and second windings 44 and 48. Rotor first and second windings 44 and 48 are tapped as illustrated by circuitry on rotor 40. This arrangement allows for converting two-phase electrical power applied across terminals X1, X2, Y1, and Y2 of rotor first and second windings 44 and 48 and synthesizing the power into a balanced three-phase sinusoidal electrical current available at terminals R, S and T of rotor first and second windings 44 and 48. The synthesized current can thereafter be provided to main field windings located on rotary portion 102.

Figure 3A:
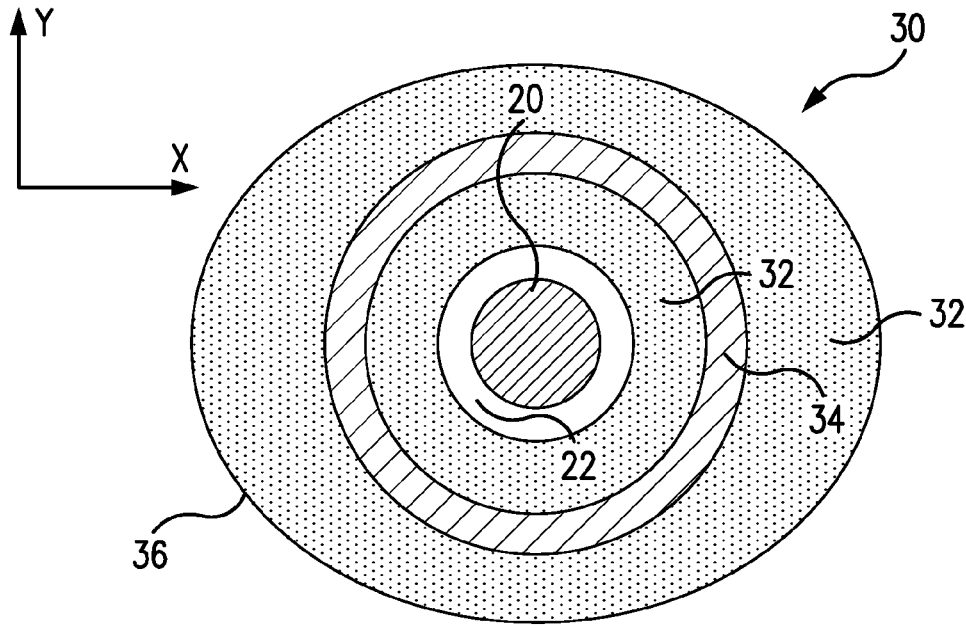
FIG. 3A and FIG. 3B are end views of faces of the stators illustrated in FIG. 1, showing windings, pole surfaces, and stator orientations, respectively.

With reference to FIG. 3A, a face of first stator 30 is shown from the perspective of rotor 40. First stator 30 includes first stator pole surface 32 and windings 34. First stator 30 also defines an aperture and a first stator periphery 36. The aperture forms radial gap 22 that extends about shaft 20. First stator periphery 36 defines the outer shape of first stator pole surface 32. First stator pole surface 32 in turn is divided into inner and outer annular portions separated by first stator windings 34, the outer annular portion of first stator pole surface 32 being bounded by first stator periphery 36 and having an oblong shape that varies the strength of the magnetic field produced by the pole surface as a function rotation angle. This means that, for a given current applied to current in rotating windings opposite first stator windings 34, current induced in first stator windings varies as a function of rotor position. The oblong shape of first stator pole surface 32 has a longitudinal axis extending in the x-direction and a lateral axis extending in the y-direction, the longitudinal axis being greater in length than the lateral axis. As illustrated, the oblong shape of first stator pole surface is elliptical. As will be appreciated, first stator periphery 36 can form other non-circular shapes as suitable for a given application.

Figure 3B:
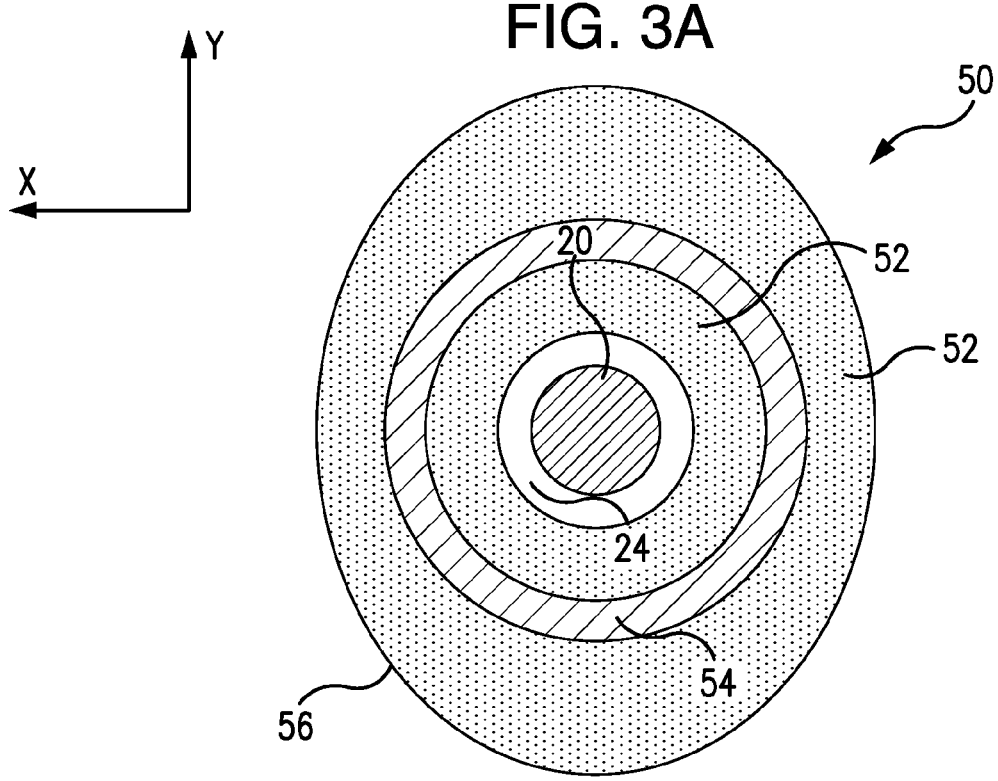

With reference to FIG. 3B, a face of second stator 50 is shown from the perspective of rotor 40. Second stator 50 is similar to first stator 30 and additionally includes a second stator periphery 56. The outer annular portion of second stator pole surface 52 has an oblong shape corresponding to that of first stator pole surface 32 (shown in FIG. 3A) and rotationally offset therefrom by 90 degrees relative to shaft 20. As will be appreciated, second stator 50 can be rotationally offset from first stator 30 by other values as suitable for inserting positional information on electrical current transferred to rotor 40 from first and second stators 35 and 50.

Figure 3C:
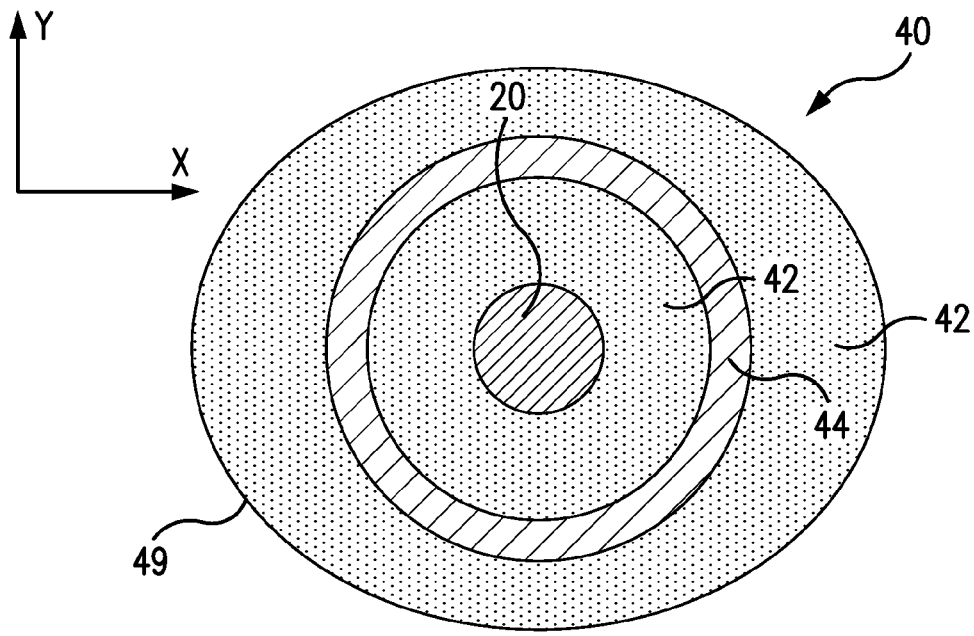
FIG. 3C and FIG. 3D are end views of opposite faces of the rotor illustrated in FIG. 1, showing windings and poles surfaces of the rotor, respectively.
Figure 3D:
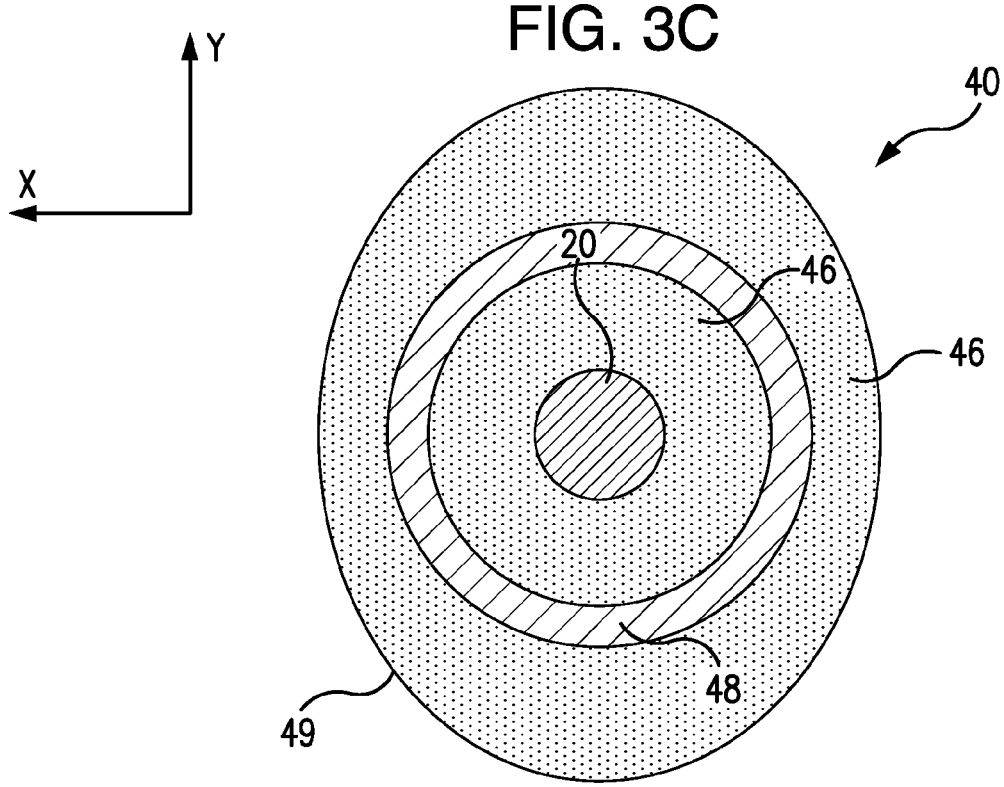
Figure 4A:
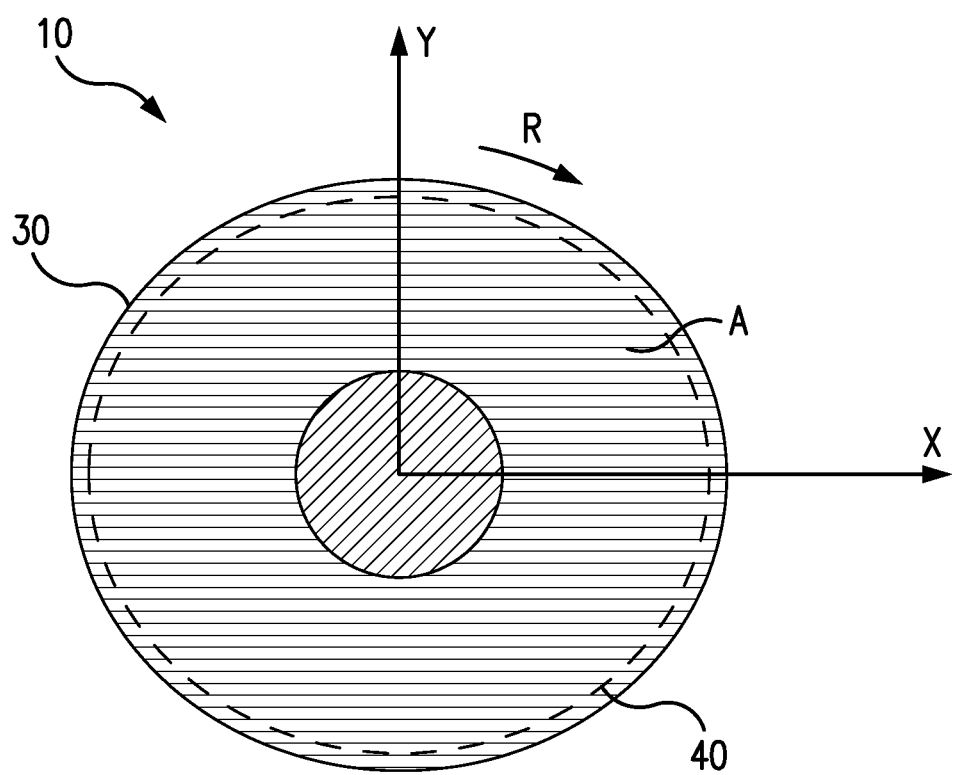
FIG. 4A and FIG. 4B are end views of overlap areas of the first stator and rotor illustrated in FIG. 1, showing overlap areas associated with different rotor positions, respectively.
Figure 4B:
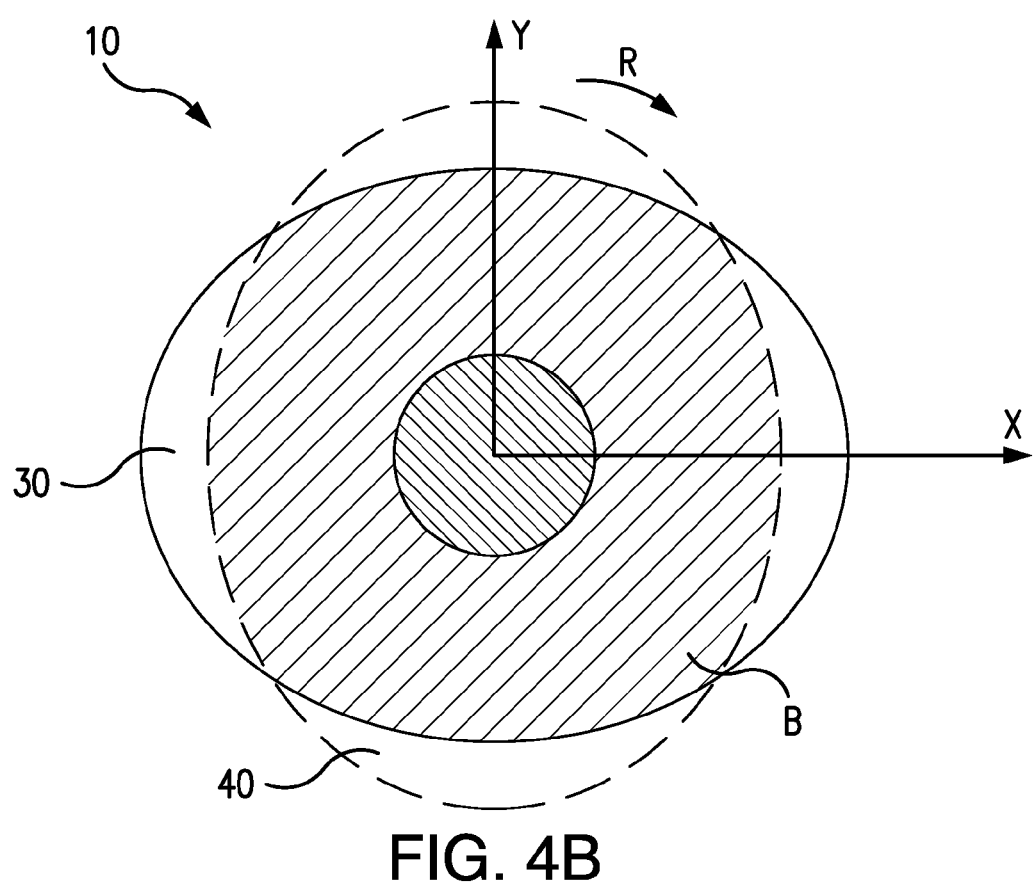

With reference to FIG. 3C and FIG. 3D, opposing faces of rotor 40 are shown. With reference to FIG. 3C, a first face of rotor 40 includes rotor first pole surface 42 and rotor first windings 44. Rotor first pole surface 42 is divided between an inner and an outer annular portion separated by rotor first windings 44. With reference to FIG. 3D, a second face of rotor 40 is shown. The second face of rotor 40 is similar to the first face and additionally includes rotor second pole surface 46 and rotor second windings 48.

Respective outer annular portions of rotor first pole surface 42 (shown in FIG. 3C) and rotor second pole surface 46 (shown in FIG. 3D) are bounded by rotor periphery 49. Rotor periphery 49 has an oblong shape with a longitudinal axis extending in the x-direction and a lateral axis extending in the y-direction in the rotor position illustrated in FIG. 3C and FIG. 3D similar to that of first and second stators 30 and 50. The longitudinal axis is longer than the lateral axis. As illustrated, rotor 30 has an elliptical shape.

Rotor 40 overlaps both first stator 30 and second stator 50. As rotor 40 rotates the overlap areas between rotor 40 and first stator 30 as well as that between rotor 40 and second stator 50 changes. In a first rotational position (shown in FIG. 4A), rotor 40 and first stator 30 have a first overlap area A. In a second rotational position offset by 90 degrees from the first rotational position (shown in FIG. 4B), rotor 40 and first stator 30 have a second overlap area B. First overlap A is greater than second overlap area B. Since overlap area influences reluctance along the flux path between opposing pole surfaces, a rotation of rotor 40 superimposes a position-reflected current onto an excitation current waveform input to first and second stators 30 and 50.

Figure 5:
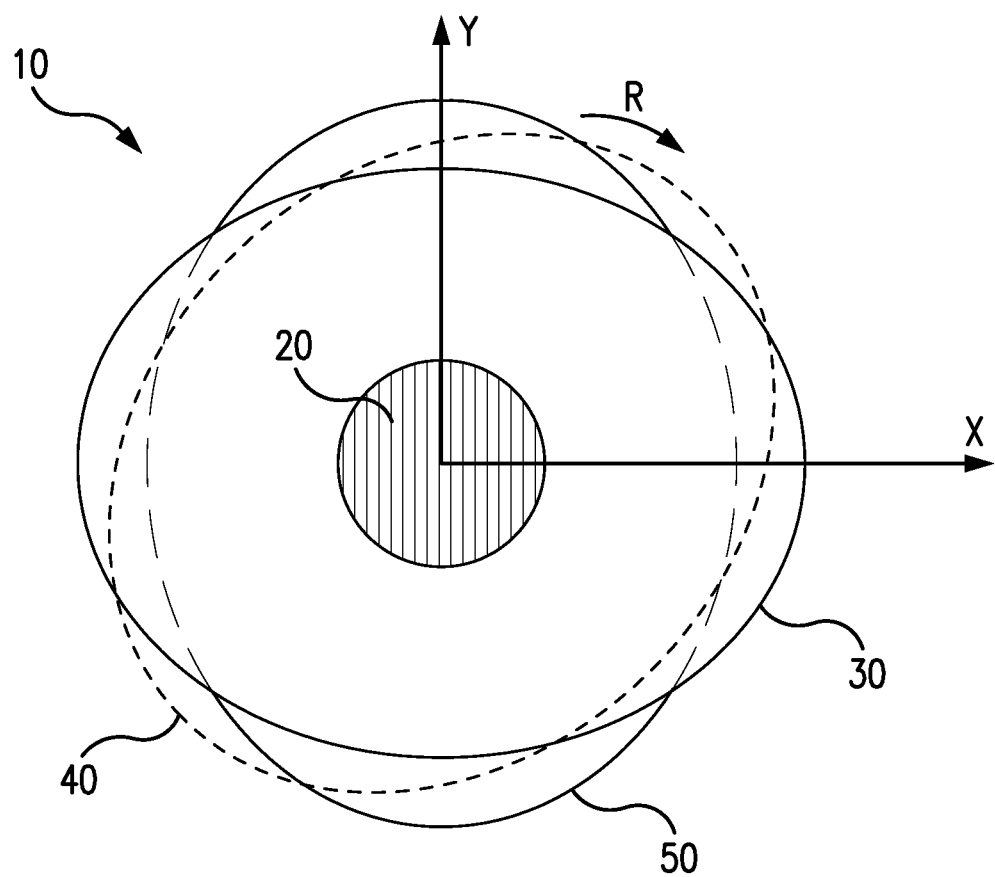
FIG. 5 is an end view of the stators and rotor illustrated in FIG. 1, showing the rotor moving in relation to the stators.

With reference to FIG. 5, first and second stators 30 and 50 are shown offset in rotation from one another by 90 degrees with respect to the axis of shaft 20. This provides for sensing rotor angular position with similar results to conventional reluctance resolvers (position sensors). Moreover, as rotor 40 does not cut magnetic flux lines respectively extending between first and second stators 30 and 50 and rotor 40, excitation is independent of rotation speed or slip frequency, thereby simplifying excitation control.

Embodiments of rotary transformers described herein can transfer current to the rotor of electrical machines as a balanced three-phase excitation current without mechanical contact. Embodiments of rotary transformers described herein can provide excitation control that is independent of rotor speed or slip frequency. Embodiments of rotary transformers described herein can also effect three-phase power transfer using a single rotor, such as a rotor disk for example. Embodiments of rotary transformers described herein can provide rotor position sensing using a Scott-T transformer and without the use of an independent measurement device, such as an external resolver or encoder for example.

Embodiments of rotary transformers described herein can be used in synchronous machines or in doubly fed induction machines. In synchronous machines, the balanced three-phase voltage induced at terminals R, S, and T can be rectified using diode bridge (not shown for reasons of clarity) mounted on the rotor. The resulting direct current output from the diode bridge can be used to power up the machine main field winding. In doubly fed induction machines, terminals R, S, and T are direction connected to the three-phase main rotor windings of the machine to generate a rotating magnetic field.

The methods and systems of the present disclosure, as described above and shown in the drawings, provide for contactless transfer of electrical current across electrical machine rotor and stator with superior properties including superimposing rotor position information on the transferred current. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A rotary transformer, comprising:
   a shaft;
   a stator with a pole surface extending about the shaft; and
   a rotor with a pole surface operatively connected to the shaft for common rotation therewith such that the pole surface of the rotor axially opposes pole surface of the stator at an overlap area,
   wherein the overlap area between the pole surface of the rotor and the pole surface of the stator is greater in a first rotor position than in a second position,
   wherein a periphery of the rotor pole surface defines an ellipse arranged orthogonally with respect to the shaft,
   wherein a periphery of the stator pole surface defines an ellipse axially opposing pole surface of the rotor.

2. A rotary transformer as recited in claim 1, wherein the overlap area between the rotor pole surface and stator pole surface is equivalent in at least two rotor positions.

3. A rotary transformer as recited in claim 2, wherein the equivalent overlap areas are separated by 180 degrees of rotor rotation.

4. A rotary transformer, comprising:
   a shaft;
   a stator with a pole surface extending about the shaft; and
   a rotor with a pole surface operatively connected to the shaft for common rotation therewith such that the pole surface of the rotor axially opposes pole surface of the stator at an overlap area,
   wherein the overlap area between the pole surface of the rotor and the pole surface of the stator is greater in a first rotor position than in a second position,
   wherein the stator is a first stator and further including a second stator with a pole surface, wherein the second stator axially opposes the rotor,
   wherein the pole surface of the first stator is offset from the pole surface of the second stator by 90 degrees relative to a rotation axis of the shaft.

5. A rotary transformer as recited in claim 4, wherein the rotor pole surface is a rotor first pole surface and further comprising a rotor second pole surface opposite the rotor first pole surface, wherein the rotor second pole surface axially opposes the second stator pole surface.

6. A rotary transformer as recited in claim 4, wherein the overlap area between the pole surface of the second stator and second pole surface of the rotor is greater in the second position than in the first position.

7. An exciter, comprising:
   a shaft operatively connected to a rotor of an electrical machine;
   a stator with a pole surface extending about the shaft; and
   a rotor with a pole surface operatively connected to the shaft for common rotation therewith such that the pole surface of the rotor axially opposes the pole surface of the stator at an oblong overlap area, wherein the overlap area between the pole surface of the rotor and the pole surface of the stator is greater in a first position than in a second position,
   wherein the stator is a first stator and further including a second stator with a stator pole surface, wherein the second stator pole surface axially opposes the rotor surface opposite the surface having the rotor pole,
   wherein the pole surface of the first stator is offset from the pole surface of the second stator by 90 degrees relative to a rotation axis of the shaft.

8. An exciter as recited in claim 7, wherein the rotor pole surface is a first rotor pole surface and further includes a rotor second pole surface opposite the first rotor pole surface, wherein the rotor second pole surface axially opposes the second stator pole surface.

9. An exciter as recited in claim 8, wherein the exciter is a rotary transformer configured for (i) receiving two-phase electrical power at the first and second stators, (ii) transmitting the received electrical power across gaps defined between the stators and opposing faces of the rotor; and (iii) converting the transmitted electrical power into three-phase electrical power on the rotor.

10. An exciter as recited in claim 7, wherein the overlap area of the second stator pole surface and rotor second pole surface in the rotor first position is equivalent to the overlap area between the rotor pole surface and stator pole surface in the second position.

* * * * *